(12) United States Patent
Trillaud

(10) Patent No.: US 10,647,221 B2
(45) Date of Patent: May 12, 2020

(54) SET OF SEATS WITH CHAIRS IN A STAGGERED ARRANGEMENT

(71) Applicant: STELIA AEROSPACE, Rochefort (FR)

(72) Inventor: Benoît Trillaud, Echillais (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 15/472,491

(22) Filed: Mar. 29, 2017

(65) Prior Publication Data

US 2019/0241094 A1    Aug. 8, 2019

(30) Foreign Application Priority Data

Mar. 31, 2016  (FR) ...................................... 1652848

(51) Int. Cl.
  *B60N 2/01* (2006.01)
  *B64D 11/06* (2006.01)
  *B60N 3/00* (2006.01)

(52) U.S. Cl.
  CPC ............... *B60N 2/01* (2013.01); *B60N 3/001* (2013.01); *B64D 11/0601* (2014.12); *B64D 11/0604* (2014.12); *B64D 11/0641* (2014.12); *B64D 11/0605* (2014.12)

(58) Field of Classification Search
  CPC ...... B60N 2/01; B60N 3/001; B64D 11/0601; B64D 11/0604; B64D 11/0605
  See application file for complete search history.

(56) References Cited

U.S. PATENT DOCUMENTS

| 6,227,489 B1* | 5/2001 | Kitamoto ............... B64D 11/00 244/118.5 |
| 2012/0298798 A1 | 11/2012 | Henshaw et al. |
| 2013/0032668 A1* | 2/2013 | Foucher ................. B64D 11/06 244/118.6 |
| 2016/0083094 A1* | 3/2016 | Clucas ............... B64D 11/0636 244/118.6 |
| 2017/0259921 A1* | 9/2017 | Valdes De La Garza ................... B64D 11/0638 |

* cited by examiner

*Primary Examiner* — Rodney A Bonnette
(74) *Attorney, Agent, or Firm* — Perman & Green, LLP

(57) ABSTRACT

A set includes seats, each seat includes a chair and a lateral pedestal arranged laterally on one side of the chair. The chairs and the lateral pedestals are arranged in a staggered configuration in two parallel rows. Each seat has a covering shell determining a rear surface in a rear zone of the chair and determining a front surface in a front zone of the lateral pedestal. A space between a rear surface of a front seat and a front surface of a rear seat forms a passage for an occupant of the rear seat. In a vertical cross section the rear surface and the front surface have convex profiles facing one another, a width of the passage increasing in the direction of decreasing heights from a height of minimum width, and increasing in the direction of increasing heights from the height of minimum width.

9 Claims, 6 Drawing Sheets

SET OF SEATS WITH CHAIRS IN A STAGGERED ARRANGEMENT

CROSS REFERENCE TO RELATED APPLICATION

This application claims priority to and the benefit of French Application No. 1652848, filed on 31 Mar. 2016, the disclosure of which is incorporated herein by reference in its entirety.

BACKGROUND

1. Field

The disclosed embodiment is in the field of the layout of passenger spaces in vehicles intended for transporting people.

The disclosed embodiment relates in particular to a set of seats, that can be converted into beds, comprising chairs arranged in offset rows.

More particularly, the disclosed embodiment relates to an arrangement in which a passage between two successive seats of a row is reduced in width without making the passage less comfortable to negotiate.

2. Brief Description of Related Developments

Passenger transport cabin layouts often face the challenge of maintaining sufficient passenger comfort to offer attractive conditions particularly when relatively long journeys are to be tolerated, or even journey lengths that encompass a period of sleep.

Such a situation is likely to arise for example in coach travel, sea crossings, and medium haul or long haul aeroplane flights.

In order to improve passenger comfort in such conditions, notably the comfort of passengers travelling in the superior classes, business class or first class, it is known practice to offer seats that can be converted into more or less full beds as the passenger wishes, through relative movements of the seat cushion of the chair and of the backrest thereof.

It is also a known practice to seek to increase the passenger density in a cabin using an arrangement whereby the chairs of two adjacent rows are staggered so that when the chairs are converted into beds, the narrow feet zone is situated at the level of the wide backrest zone of an adjacent row, making it possible to form a set of two space-sharing rows of chairs the overall width of which is less than twice the maximum width of one chair.

However, with such an arrangement it is necessary to maintain, between the back of one seat and the front of a seat situated behind in the same row, when the seats are converted into beds, a passage for the occupant of the offset seat of the shared-space row when this seat is not against a cabin aisle. The width of this passage adds to the length of the seat converted into a bed to determine the pitch of the seats and limits the number of seats that can be set out for a given length of cabin.

One solution for reducing the pitch of the seats is to reduce the width of the passage, or even to eliminate the passage, when the seats are converted into beds.

However, this solution is unacceptable because a passenger accommodated away from an aisle may wish to leave his/her seat and then have to clamber over the seat separating him/her from the aisle or get up onto a raised walkway part as, for example, in the solution described in US Publication No. 2012/0298798 A1.

SUMMARY

It is an objective of the presently disclosed embodiment to overcome these disadvantages by providing the passenger, for an equivalent bed length, with a passage suited to his/her movements between his/her seat and a distant aisle.

For that, the disclosed embodiment relates to a set comprising a plurality of seats arranged in a row along a longitudinal axis X, each seat comprising a chair and comprising a lateral pedestal arranged laterally on one side of the chair, in which set the chairs on the one hand and the lateral pedestals on the other are arranged in a staggered configuration in two parallel rows oriented in the same direction as the longitudinal axis X of the set of seats.

Furthermore, each seat comprises a covering shell determining a rear surface in a rear zone of the chair of the seat and determining a front surface in a front zone of the lateral pedestal of the seat.

All the chairs of one and the same set of seats are oriented with a front side of the chair oriented substantially in one and the same direction and a space between a rear surface of a front seat and a front surface of a rear seat, situated immediately behind the said front seat in the set, forms a passage for an occupant of the said rear seat.

According to the disclosed embodiment, in a cross section formed in a vertical plane in which a minimum width $L_{min}$, of the passage is situated, the rear surface and the front surface have convex profiles facing one another, a width $L(hz)$ of the passage in the said vertical plane increasing continuously in the direction of decreasing heights hz, considered above a reference cabin floor and increasing upwards, from a height $hz_{min}$ of the minimum width $L_{min}$, at least down to near floor level, and the width $L(hz)$ increasing continuously in the direction of increasing heights hz from the height $hz_{min}$ of minimum width $L_{min}$.

The width of the passage, and therefore the distance separating two chairs of one and the same row is thus reduced by limiting the range of heights over which the passage is of reduced width so as to allow a passenger to negotiate the passage without appreciable impediment, and by making use of the reduction in the minimum width of the passage to decrease the pitch of the seats without reducing the length allocated to an individual for his/her own comfort.

In one aspect of the presently disclosed embodiment, the minimum width $L_{min}$ of the passage is comprised between 200 mm and 300 mm and the height $hz_{min}$ of the said minimum width above the floor is comprised between 200 mm and 500 mm. A sufficient passage width is thus maintained in the region of the lower parts of the lower limbs of an individual and the minimum width is near the height of a lie-flat area when a chair is in a bed position which is the most demanding in terms of length.

In one aspect of the presently disclosed embodiment, the maximum width $L(hz)$ of the passage, in the vertical plane in which the minimum width $L_{min}$ of the said passage is situated, is, for heights hz lower than the height $hz_{min}$, comprised between 310 mm and 400 mm, and the said maximum value is situated between floor level and a height hz equal to or lower than 150 mm, the width $L(hz=0)$ of the passage at floor level being at least equal to 250 mm. A width suited to the passage of the feet of an individual negotiating the passage is thus maintained near floor level.

In one aspect of the presently disclosed embodiment, a minimum value for the width L(hz) of the passage, measured in a horizontal section, is, for heights hz higher than the height $hz_{min}$, greater than the minimum width $L_{min}$ of the said passage and less than or equal to 400 mm, a larger value for the said minimum value of the width L(hz) being achieved for a height hz comprised between 600 mm and 800 mm. A widened passage is thus formed at heights corresponding to the similarly wider parts of the body of an individual negotiating the passage.

In one aspect of the presently disclosed embodiment, the rear surface of the shell covering a seat in a rear zone of the chair of the said seat has a convex shape substantially in the form of a semi-circle in cross sections on horizontal planes, giving the said rear surface a pseudo-ellipsoidal cap shape.

In one aspect of the presently disclosed embodiment, the front surface of the shell covering a seat in a front zone of the lateral pedestal of the said seat has a shape that is substantially straight in sections on horizontal planes, giving the said front surface the shape of a partial cylinder with substantially horizontal axis and generatrices, oriented substantially in the transverse direction Y.

In one aspect of the presently disclosed embodiment, the axis and the generatrices oriented substantially in the transverse direction Y form an angle of deflection of less than 25° with respect to the transverse direction Y so that an axis of the passage is not perpendicular to the direction of an aisle onto which the passage opens.

These shapes of the covering shell make it possible to create concave volumes of shapes suited to the build of the passengers both at head level and at feet level, particularly in the lying-down position, and give the passage, in plan view, a convergent-divergent shape which limits the narrowest length of the said passage and guides the passenger as he or she moves around, without forming sharp corners.

In one aspect of the presently disclosed embodiment, the lateral pedestal of a front seat has a volume open towards the rear to form a space for the feet of an occupant of a rear seat the chair of which is substantially aligned with the said open volume because of the staggered configuration of the chairs and of the lateral pedestals.

In one aspect of the presently disclosed embodiment, a chair can be converted into a bed by relative movements of a backrest and of a seat cushion of the said chair in order, with a surface that is substantially horizontal permanently or deployed in the open volume that forms a foot space, of the lateral pedestal of the seat situated in front of the seat of the chair in question, to form a lie-flat area.

In one aspect of the presently disclosed embodiment, the width L(hz) of the passage, in the cross section formed in a vertical plane in which the minimum width $L_{min}$ of the said passage is situated, is 324±10 mm at a height above the floor hz=130 mm, is 251±10 mm for hz=230 mm, is 232±10 mm for hz=330 mm, is 235±10 mm for hz=430 mm, is 246±10 mm for hz=530 mm, is 267±10 mm for hz=630 mm, and is 308±10 mm for hz=730 mm.

A set of seats is thus formed which, particularly in an aircraft business class type arrangement while having demonstrated its ability to afford the desired comfort of access, makes it possible to offer seats that can be converted into beds while at the same time minimizing the impact this has on the lengthwise space required, and while at the same time enjoying advantages in terms of the width required, which advantages are afforded by the staggered configuration, when just one seat in a two-row set of seats is flanked by an aisle.

BRIEF DESCRIPTION OF THE DRAWINGS

The disclosed embodiment is described in detail with reference to the drawings which schematically depict:

FIG. 5a for a small-sized passenger corresponding to the 5th percentile of a sample of passengers; FIG. 5b for a medium-sized passenger corresponding to the 50th percentile of the sample; and FIG. 5c for a large-sized passenger corresponding to the 95th percentile of the sample.

The drawings in the figures are not necessarily drawn to the same scale.

In the figures, parts or elements that are similar, even when depicted in different forms, bear the same reference.

The figures chiefly illustrate the exterior shapes of the seats of the set and the finer details, particularly the interior structures of the seats, are not depicted or are depicted only as a secondary consideration for the sake of understanding of the drawings.

DETAILED DESCRIPTION

Figure 1:
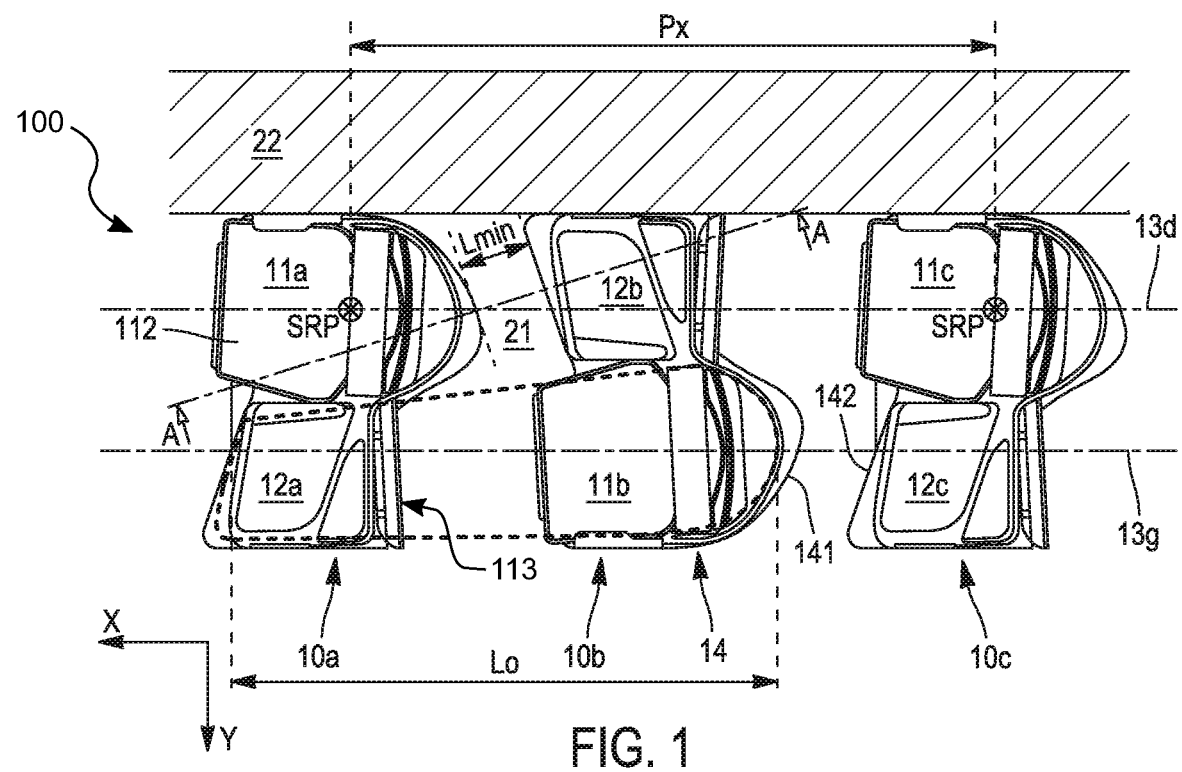
FIG. 1 shows a plan view, a set of 3 seats according to the presently disclosed embodiment of which the chairs, oriented forwards substantially in one and the same direction, are arranged in a staggered configuration in two shared-space rows, the seats being depicted in chair configuration.

FIG. 1 depicts a plan view of a set 100 of three seats 10a, 10b, 10c according to one aspect of the disclosed embodiment.

In the set 100 each seat 10a, 10b, 10c comprises a chair, 11a, 11b, 11c, respectively, and comprises a lateral pedestal 12a, 12b and 12c respectively, arranged on one side of the seat.

As can be seen in FIG. 1, the chairs on the one hand and the lateral pedestals on the other are arranged in a staggered configuration in two parallel rows oriented along a longitudinal axis X of an axes system connected with the set of seats.

In the set considered, the chairs are substantially oriented in one and the same direction so that passengers occupying the various chairs of the set of seats are all facing in one and the same direction.

In the remainder of the description, reference will be made as needed to an axes system connected with the set of seats and in which a direction of the longitudinal axis X corresponds to a longitudinal direction of the set of seats and therefore to the directions of the longitudinal axes 13d, 13g of the rows of seats of the set 100.

The longitudinal axis X is oriented positive towards the front of the set 100 which corresponds substantially to the front of the seats, the front being the forwards direction as understood by an occupant of a chair, all the chairs 11a, 11b, 11c of the set considered being oriented in substantially one and the same direction.

The axes system also comprises a vertical axis Z, perpendicular to the longitudinal axis X, in a vertical direction and oriented positively upwards.

The axes system comprises a lateral axis Y in a horizontal plane and oriented positively to the left, for an occupant of a chair, so as to form a direct tetrahedron XYZ.

Each seat 10a, 10b, 10c comprises a covering structure comprising an envelope shell which determines the volumes occupied by the seat concerned and which, both for mechanical reasons and for aesthetic reasons, covers the various functional parts of the chair 11a, 11b, 11c respectively and of the lateral pedestal 12a, 12b, 12c respectively.

In the remainder of the description reference will, for the sake of clarity, be made to any one of the seats of FIG. 1 when the description applies to a single seat in isolation, and reference will be made to the seat 10a as being a front seat and to the seat 10b as being a rear seat when the description applies to two seats following one another in the longitudinal direction within the set 100. It must be appreciated that this choice is arbitrary, the various seats of a set being similar, except that two successive seats in the direction of the longitudinal axis X are the mirror image of one another in a vertical plane XZ.

The lateral pedestal 12a of the front seat 10a comprises a hollow volume, open to the rear, in which a horizontal surface forming a footrest 113, or comprising such a horizontal surface, on which the occupant of the chair 11b of the rear seat 10b can place his or her feet can be deployed.

This option is offered to the passenger of the rear chair 11b which is situated behind and substantially in line with the said lateral pedestal because of the staggered arrangement of the chairs of the set 100, particularly when the said rear chair is converted into a bed.

In the bed configuration, a seat cushion 112 of the chair, a backrest 111 of the chair and the footrest 113 formed in the lateral pedestal situated in front of the chair determine substantially horizontal surfaces at one and the same height, with respect to a horizontal reference plane 20, to form a lie-flat area.

Thus, although associated in the presently disclosed embodiment illustrated with a front seat 10a, for which the lateral pedestal 12a incorporates functions of the said seat, such as side-table or support, storage and auxiliaries integration functions, for example providing electrical power supplies, lighting, control or air distribution panels, not depicted, the covering structure in respect of its part regarding the lateral pedestal 12a also determines a maximum forward extension of a rear seat 10b, which maximum extension is associated with the front end of the bed formed by the said rear chair in the bed position.

The covering structure of the rear seat 10b, in its part corresponding to the lateral pedestal 12b, thus determines a front surface 142 of the covering structure 14b of the said rear seat.

The covering structure of the front seat 10a, in the part corresponding to the chair 11a, determines a rear surface 141 of the covering structure 14a of the said front seat, an extension associated with the rear end of the bed formed by the said chair in the bed position.

Considering the staggered arrangement of the chairs, and given the mirror-image symmetry between the two seats 10a, 10b succeeding one another in the set 100, the rear surface 141 of the covering structure 14a of the front seat 10a at the level of the chair 11a, more particularly of the backrest of the said chair, finds itself facing the front surface 142 of the covering structure 14b of the rear seat 10b at the level of the lateral pedestal 12b.

Given a pitch Px for the seats of the set 100, that corresponds to a distance separating, in the longitudinal direction X, reference points SRP of two successive chairs aligned in a row of seats of the set, and the lie-flat length Lo of a seat in the bed position, an intermediate space 21 is determined between the rear surface 141 at the level of the chair 11a of the front seat and the front surface 142 at the level of the lateral pedestal 12b of the rear seat.

As depicted in the illustrations, the intermediate space 21 forms a passage between the chair 11b of the rear seat 10b and an aisle 22 situated with respect to the said chair on an outer edge of the seat on the side of the lateral pedestal 12b of the said seat.

FIG. 1 illustrates how a width Lp of the passage 21 is dependent on the pitch Px of the seats and on the length Lo of the bed.

To a first approximation, the width Lp of the passage is equal to the pitch Px of the seats decreased by the length Lo of the bed and decreased by a thickness Dcl corresponding to the cumulative local thicknesses of walls of the covering structures 14a, 14b.

It is generally accepted that, in order to offer a seat occupant sufficient comfort, the width Lp needs to be approximately 355 mm (14"), a value of 305 mm (12") for this width sometimes being considered to be an acceptable minimum that will allow an individual to cover the short distance separating the chair 11b from the aisle 22. In practice, the width Lp is chosen, as a function of comfort criteria that are acceptable in the category of seat concerned, which generally differ between first class, business class and economy class.

However, this first approximation to calculating the width Lp of the passage does not take account of the build of the occupant of the seat and the dynamics of his/her movement when moving in one direction or the other between the chair 11b and the aisle 22.

In order to reduce the pitch Px of the seats of the set 100, without reducing the length Lo of the bed, the shapes of the structure covering the seats are adapted, as in the example illustrated, in order to reduce the width Lp of the passage 21 while at the same time maintaining, for a user of the seat, a comfortable passage 21 for his/her movements to or from the aisle 22, the width of a passage not necessarily being a constant, either over the height of the said passage or along a length of the said passage between the chair and the aisle.

Figure 2:
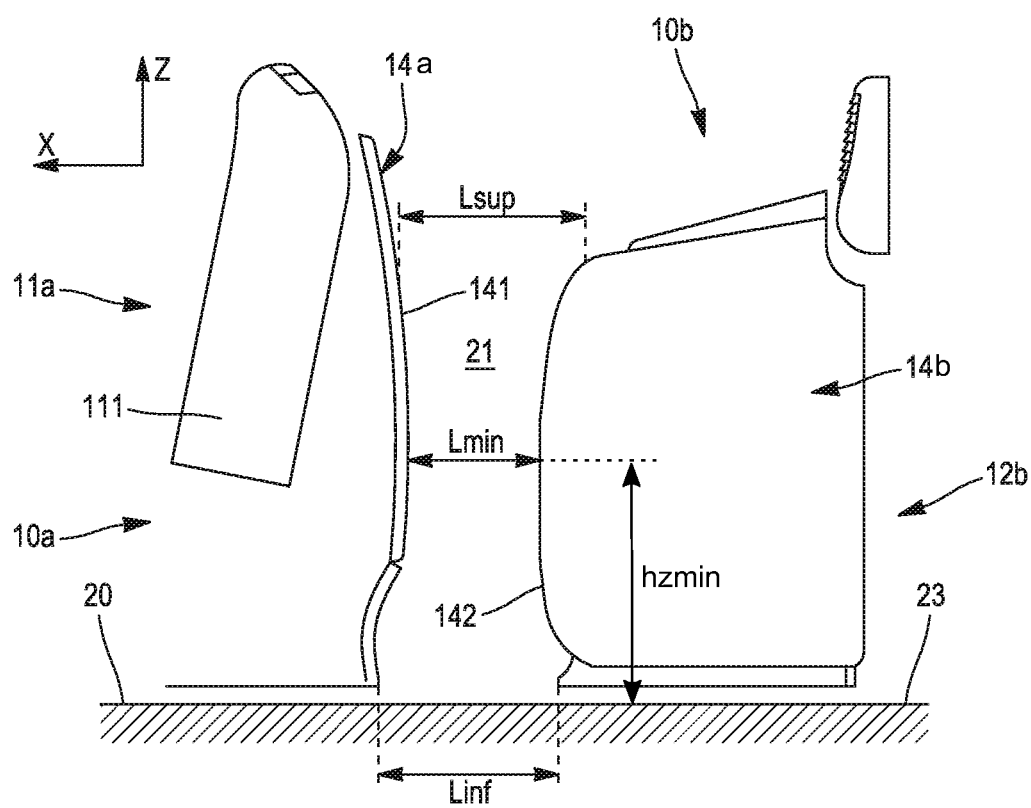
FIG. 2 shows section AA of the set of seats of FIG. 1, illustrating in a vertical plane the passage formed between a seat and an aisle in its narrowest part.

FIG. 2 shows the external shapes of the covering structures 14a, 14b determining the geometry of the passage in a vertical section identified as AA in FIG. 1, in a zone of the passage 21 in which the width is at its narrowest, and in particular shows the rear surface 141 of the covering structure 14a of the front seat in the zone of the chair and the front surface 142 of the covering structure 14b of the rear seat in the zone of the lateral pedestal.

As illustrated in the vertical section of FIG. 2, each of the two, rear 141 and front 142, surfaces is convex in the passage zone considered, except for connecting shapes near floor level, so as to determine a width L(hz) of the passage 21 as a function of a height hz above a cabin floor 23 on which the users of the seats move around, which floor may correspond to the horizontal reference plane 20 as in the remainder of the description, or may be offset from the said horizontal reference plane by a constant amount.

The convex shapes of the rear 141 and front 142 surfaces facing one another determine, in the vertical plane of the narrowest zone of passage, a minimum width $L_{min}$ of the passage 21 which minimum width is situated at a height $hz_{min}$ above the floor 23 which correspond substantially, when viewed in the section corresponding to the said vertical plane, to the height of a forward most point of the said front surface and to the height of a rearmost point of the said rear surface.

In order to allow the lower part of the lower limbs to pass comfortably, the minimum width $L_{min}$ is advantageously comprised between 200 mm and 300 mm, the latter value being limited chiefly so as not to needlessly increase the pitch of the seats and lose the benefit of the arrangement of the disclosed embodiment for reducing the pitch of the seats, and the said minimum width $L_{min}$ is situated at a height $hz_{min}$ comprised between 200 mm and 500 mm above floor level.

Because of the convexity of the said front and rear surfaces facing one another, the width L(hz) of the passage 21 increases continuously in the direction of decreasing heights hz from the height $hz_{min}$ of minimum width down to near floor level, and likewise increases continuously in the direction of increasing heights hz from the said height $hz_{min}$.

The widening of the passage below the height $hz_{min}$ of minimum width allows an individual to have in the passage 21 an enlarged volume, of a width that is increased with respect to the minimum width, in the zone in which his or her feet pass. This enlarged zone prevents a foot from being snagged and an individual from tripping.

In order to maintain the possibility of a passenger moving sideways through the passage, the maximum width of the width of the passage near floor level is comprised between 310 mm and 400 mm and this maximum width which allows the passage of the feet is situated between floor level and a height of 150 mm above floor level. The passenger can thus lift his or her feet, at least slightly, when moving along the passage and the choice will also be made to determine a width $L_{inf}$ of at least 250 mm at the level of the floor surface so as to allow the passenger to place his or her feet on the floor even in the minimum-width section of the passage, or to move them without catching on structures.

The widening of the passage above the height $hz_{min}$ of minimum width makes it possible to have available at the level of the top of the lower limbs and pelvis of an individual (of average build) a volume that is likewise enlarged, and a passage width that is increased with respect to the minimum width in the minimum-width section of the passage.

Particularly at the level of the upper part of the lower limbs, a width $L_{sup}$ of the passage will advantageously be comprised between 310 mm and 410 mm, the said width $L_{sup}$ being obtained for a height above floor level of between 600 mm and 800 mm, advantageously substantially a height of the lateral pedestal 12b above the floor 23 of the order of 730 mm as in the example illustrated in the figures.

Figure 3:
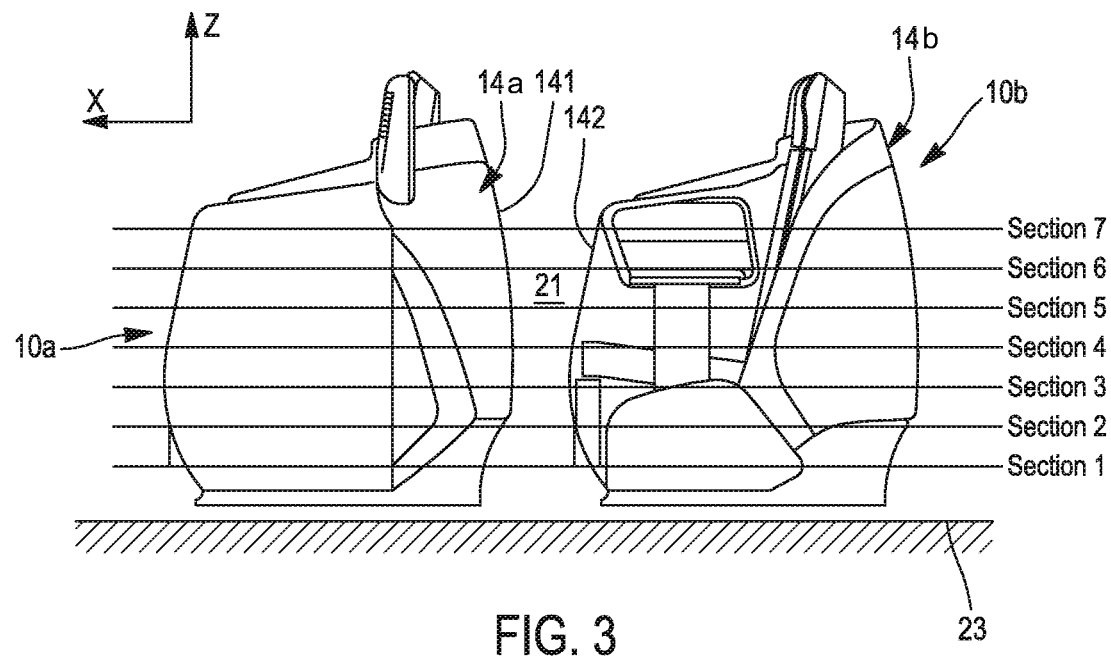
FIG. 3 shows a side view, a set of two longitudinally offset seats as illustrated in FIG. 1, and in which view are illustrated section planes at constant heights with respect to a reference floor.
Figure 5C:
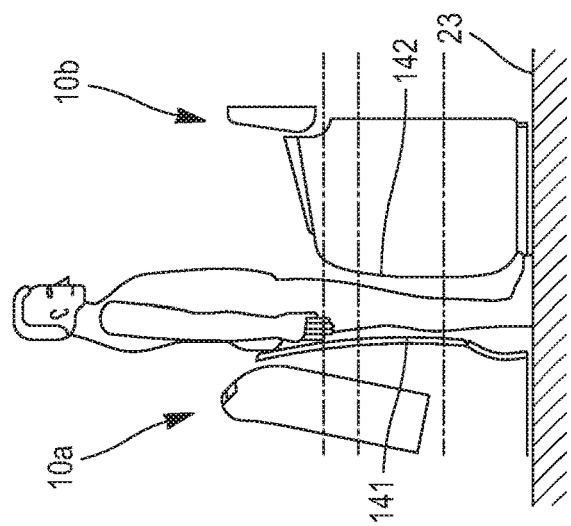
FIGS. 5a to 5c show views in vertical section of the passage in its narrowest part corresponding to the section of FIG. 2, passengers of different sizes and builds standing in the passage.

It should be noted that in instances in which the rear surface 141 extends over a height greater than the extension of the front surface 142, as in the exemplary aspect illustrated in the figures, visible particularly in FIGS. 2, 3 and 5, the convexity of the said front surface extends as far as the uppermost point of the said rear surface so that an individual, even a large individual, can maintain a substantially upright posture in the passage without being impeded as illustrated in FIG. 5c.

This widened zone gives the individual more clearance at the top of his or her lower limbs and pelvis which are larger in size than the lower parts of the lower limbs and are liable to sway as the individual moves around.

It should be noted that, between the height $hz_{min}$ and the level of the floor 23, corresponding to a zero value for the height hz, the width of the passage may be increased rapidly and to a suitable extent provided that this does not create any interference with chair structures or equipment towards the front or lateral pedestal structures or equipment towards the rear.

Figure 5B:
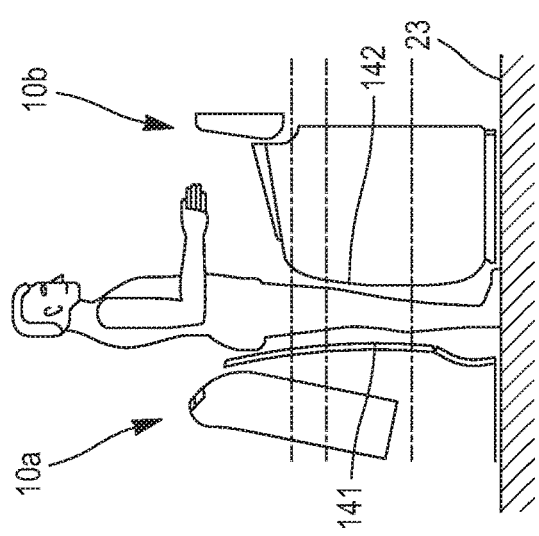
Figure 5A:
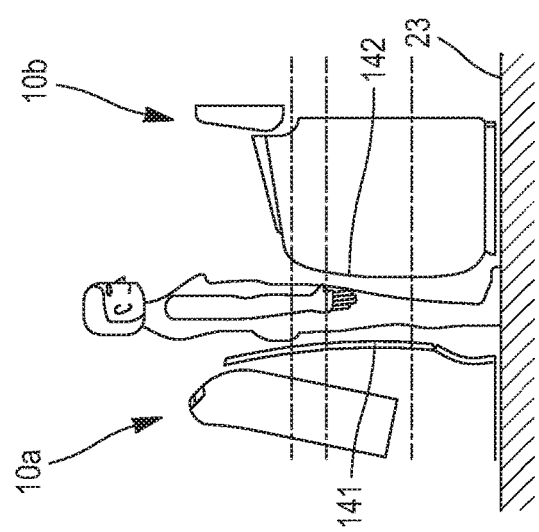

These various conditions governing the shapes and dimensions of the passage 21 in its narrowest part are illustrated in the drawings of FIGS. 5a-5c under conditions of use by people of different sizes and builds. FIG. 5a shows a small-sized individual corresponding to the 5th percentile of a population of passengers, FIG. 5b an individual of medium size corresponding to the 50th percentile, and FIG. 5c a large-sized individual corresponding to the 95th percentile. In these three cases, that cover 90% of the population considered, it may be noted that the individual is not impeded in his/her movement in the passage 21 despite the narrowness of the said passage, which is just 232 millimetres in its narrowest part in the example illustrated.

Also, because of the correspondence between the height of the forward most point of the front surface and the height of the rearmost point of the rear surface, an axis of the passage 21, when viewed in profile, is substantially vertical, allowing the passenger in the passage to maintain an upright posture and avoid a tendency to lean over which he would have to do if there were a significant height offset in the convexities facing one another.

Furthermore, the minimum width of the passage 21 affects only a vertical section of the passage.

As can be seen in the plane view of FIG. 1, the rear surface 141 of the covering structure 14a of the front seat is also curved in a horizontal plane XY and has a convexity which, combined with the convexity in the vertical plane, gives to the said structure in the zone considered a pseudo-ellipsoidal shape, more particularly the rear surface 141 is similar to a domed surface of an ellipsoidal cap.

The convexity in a horizontal plane XZ is accentuated to the point of becoming similar to a substantially semi-circular plot, namely a curve with rounded shapes of which tangents to the open ends are substantially parallel, as illustrated in the cross sections of FIGS. 4a to 4g, giving the covering structure a wraparound shape.

The domed shape of the rear surface 141 of the covering structure in the chair zone corresponds to a wraparound concave shape in the head zone of an occupant of the seat when the chair 11a is converted into a bed, which corresponds to a natural shape of the body in the zone of the head which is not subjected, as the feet might be, to ample and/or fairly intense movements. This wraparound shape at head level also, in bed configuration, affords the individual a better sense of isolation cutting out light and ambient noise.

Furthermore, as the sections of FIGS. 4a to 4f illustrate, the front surface 142 of the covering structure in the zone of the lateral pedestal 12b of the rear seat is substantially rectilinear in plan view, and this corresponds to a substantially regulated front surface 142 of an element of cylindrical surface of substantially horizontal axis resting on the curve described above in the section comprising the minimum width $L_{min}$ of the passage 21.

This shape of the lateral pedestal 12b makes it possible to form a foot space of relatively large dimensions, particularly for a width of the said foot space, in which it is possible for a person lying down to move their feet and turn over in the bed position without difficulty.

According to one aspect of the disclosed embodiment corresponding to the case of the example illustrated in the figures, generatrices of the element of cylindrical surface of the front surface 142 form in the horizontal plane XY an angle of deflection away from the lateral direction Y. This angle of deflection, if appropriate associated with asymmetry in plan view of the rounded shape of the rear surface 141, allows an axis of the passage 21 to be orientated so that it is not perpendicular to the longitudinal direction X of the aisle 22, in order to make the said passage more ergonomic, and allows the narrowest part of the passage to be offset laterally, advantageously on the aisle side, with respect to an axis of the chairs 11a, 11c of the set which are situated on the said aisle side.

Advantageously, the height of the lie-flat surface in the bed position is close to the height $hz_{min}$ so as to enjoy the maximum forward extension of the foot rest zone and the maximum rearward extension at passenger head level.

Figure 4A:
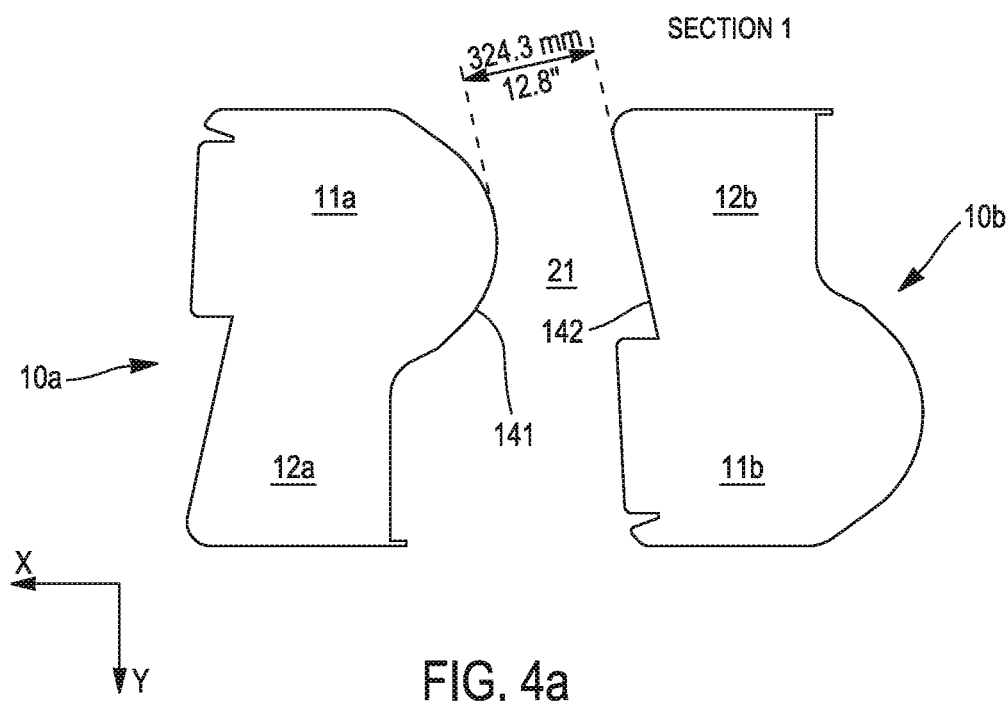
FIGS. 4a to 4g show cross sections in the horizontal planes at different heights depicted in the side view of FIG. 3 and showing the outlines of the envelope shapes of the seats of FIG. 3.
Figure 4B:
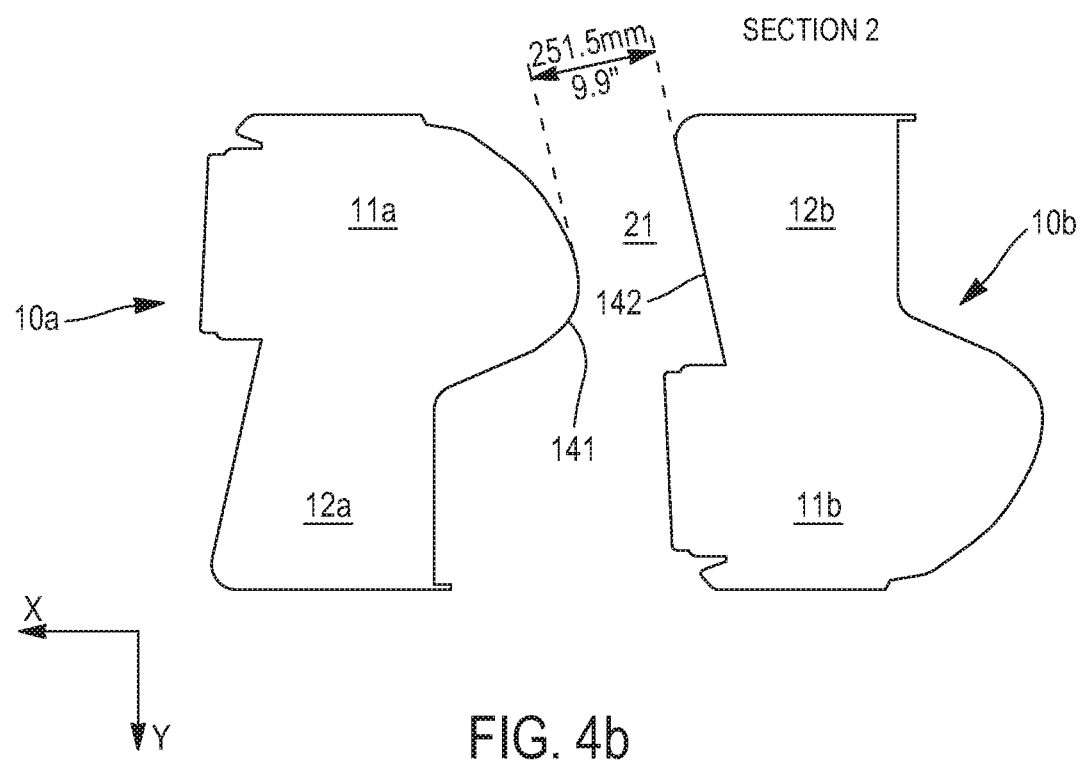
Figure 4C:
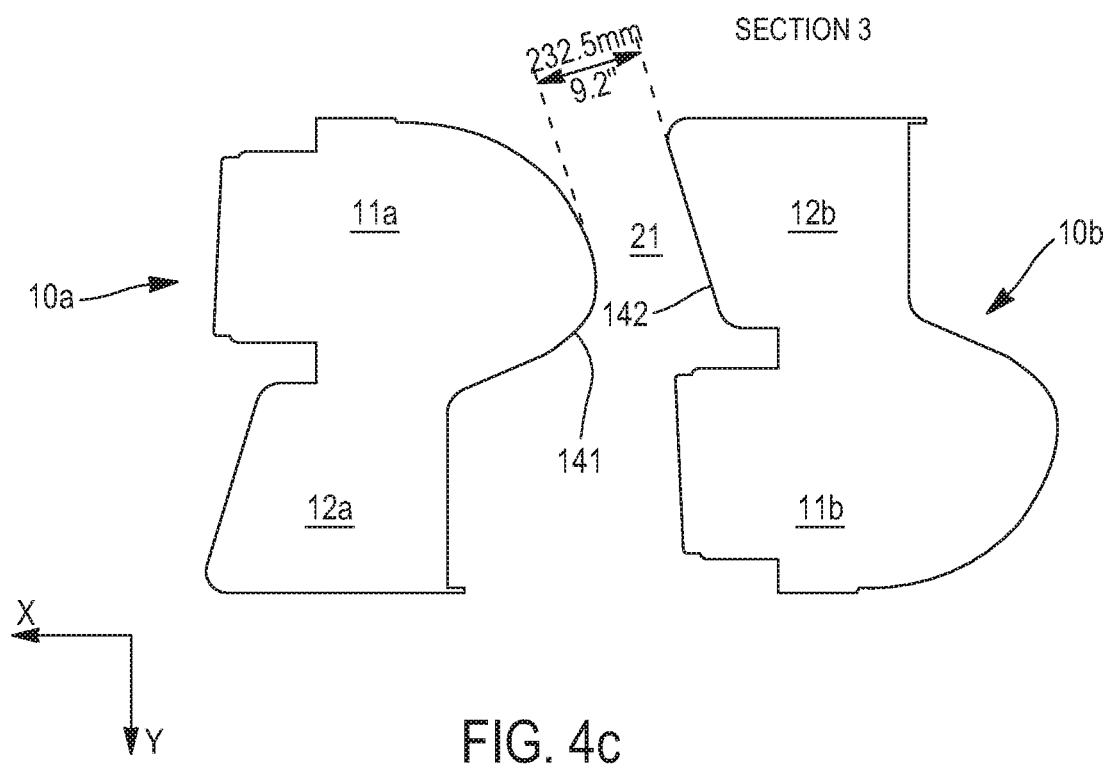
Figure 4D:
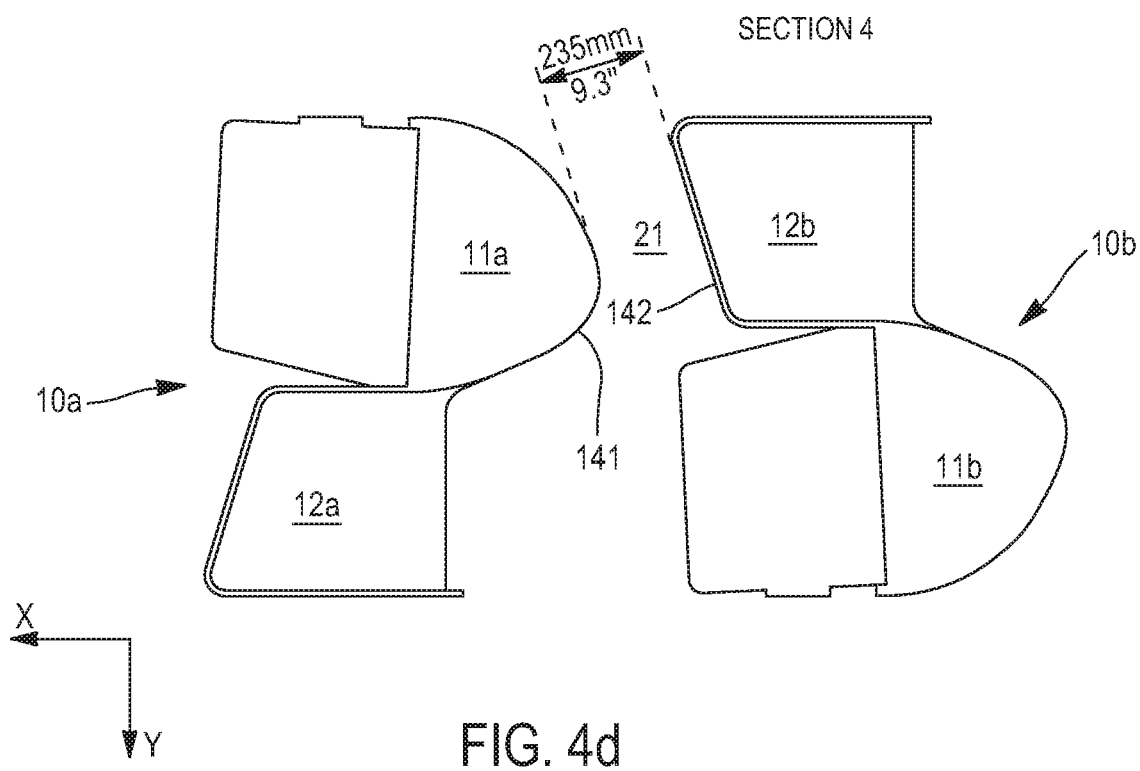
Figure 4E:
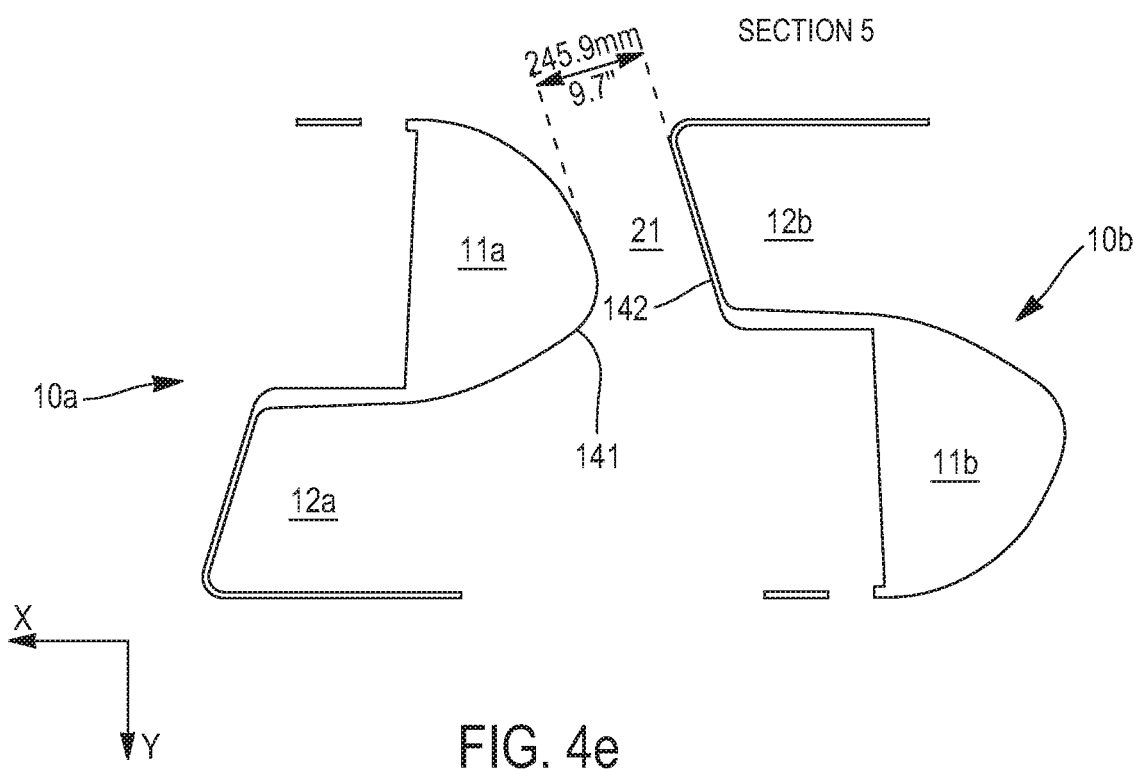
Figure 4F:
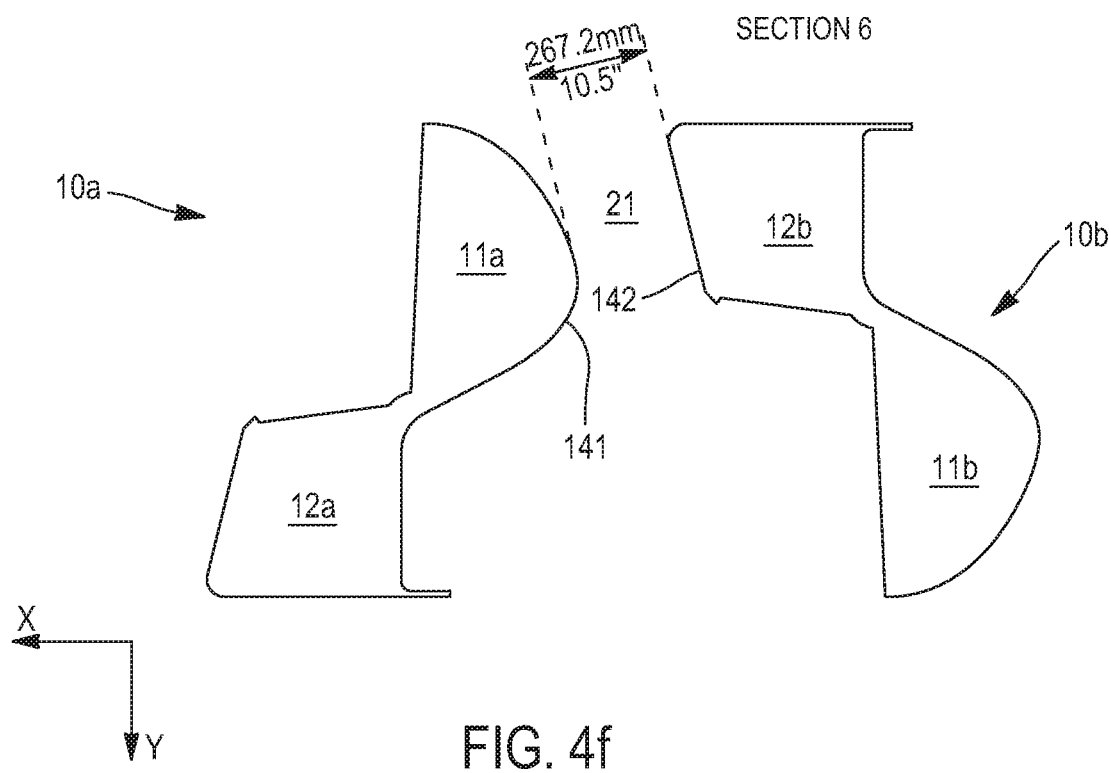
Figure 4G:
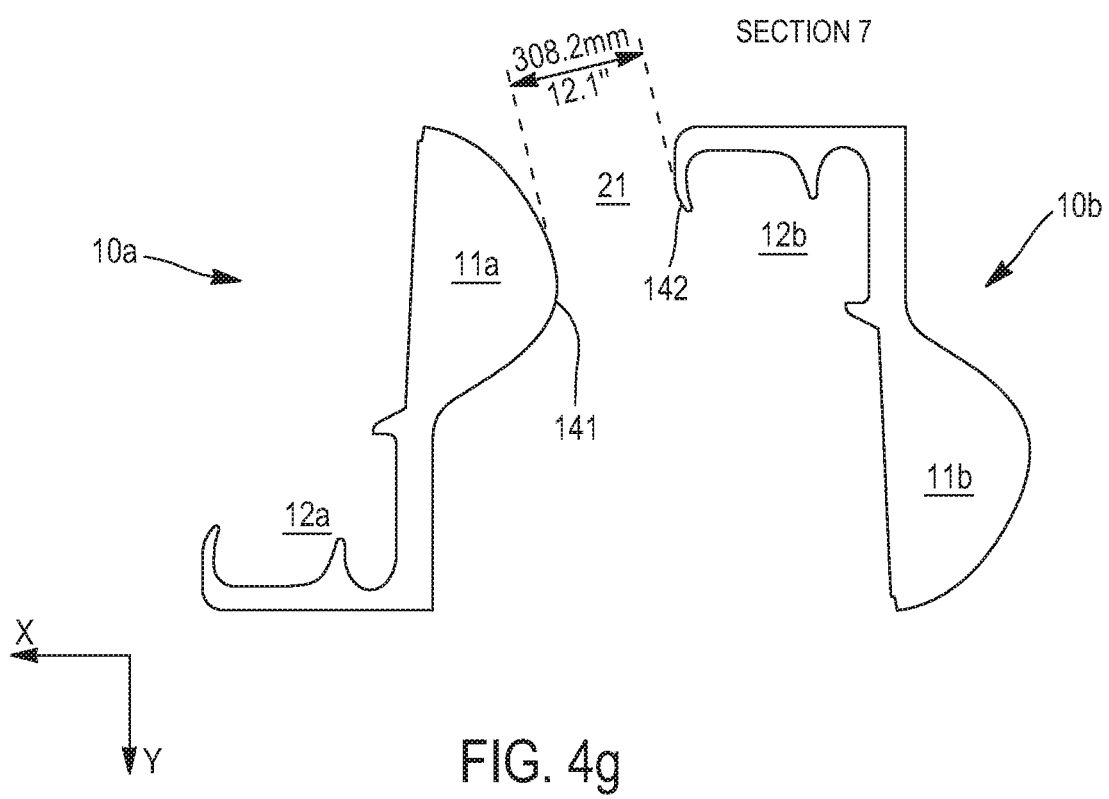

Thus, the passage 21 widens quickly in plan view on each side of its narrowest part, adopting a convergent-divergent shape, with a throat of width $L_{min}$ in a section taken at the height $hz_{min}$ as in FIG. 4c.

This convergent-divergent shape also has the effect of naturally guiding the seat user as he or she enters the passage 21 and of affording him or her greater ease of movement once the minimum width of the said passage has been negotiated, particularly as the individual accesses his or her seat from the open space of an aisle.

This feature can be seen in FIG. 4c which schematically depicts the envelope outlines of the front seat 10a and of the rear seat 10b in a section formed in a horizontal plane XY at the height hzmin.

This feature can also be found in the other sections, formed in horizontal planes that are offset from the plane of the section of FIG. 4c, from FIGS. 4a to 4g, the minimum passage width in the section considered evolving, as was described earlier, so that it increases below and above the plane corresponding to the minimum value of the width $L_{min}$ of the passage 21, and always being greater than the said width $L_{min}$.

In the exemplary aspect illustrated, the minimum passage width as a function of height above floor level evolves as indicated in the table below:

| Fig No. | Section No. | hz-$hz_{min}$ in mm | Min passage in mm | Min passage in inches |
| --- | --- | --- | --- | --- |
| 4a | 1 | −200 | 324 | 12.8 |
| 4b | 2 | −100 | 251 | 9.9 |
| 4c | 3 | 0/$hz_{min}$ | 232 | 9.2 |
| 4d | 4 | +100 | 235 | 9.3 |
| 4e | 5 | +200 | 246 | 9.7 |
| 4f | 6 | +300 | 267 | 10.5 |
| 4g | 7 | +400 | 308 | 12.1 |

In this example, the height $hz_{min}$ (the plane of section 4c) of the minimum width is 330 mm above floor level.

The above values are given only by way of illustrating through a concrete example a presently disclosed embodiment that affords a level of comfort suited to a business class in an aircraft, and they can be modified by plus or minus 10 mm while maintaining an acceptable level of comfort if the minimum width $L_{min}$ is decreased and slightly increased at the expense of a lengthening of the pitch of the seats if the minimum width $L_{min}$ is increased.

The table considered does not include minimum passage widths above the level of +400 mm with respect to the height $hz_{min}$, the front surface 142 of the passage being considered to be limited to this height in the example detailed. However, the rear surface 141 which is still convex above this level leads to a continued widening of the passage that would be determined virtually by extending the convex profile of the front surface 142.

However, these values may be modified by those skilled in the art upwards or downwards according to the level of comfort he wishes to obtain or, conversely, according to the constraints he is prepared to introduce.

Quite obviously the value of the minimum width $L_{min}$ of the passage 21 at the height $hz_{min}$ must conform to a minimum passage value that is acceptable not only for the purposes of comfort with respect to the user of the seat but also to allow emergency evacuation where there are applicable standards as in most public transport vehicles, for example passenger aircraft.

There is no theoretical limit to choosing a larger value for the minimum width $L_{min}$ of the passage 21, but it should be pointed out that choosing an increased minimum passage width goes against the presently disclosed embodiment's desire to reduce the pitch of the seats and that, beyond a standard passage value, user comfort is not necessarily improved.

Advantageously, the minimum width $L_{min}$ of the passage 21 is comprised between 200 mm and 300 mm, the passage width values for the heights other than the height $hz_{min}$ being adapted to facilitate passage through the passage 21, as described earlier.

At floor level, the width $L_{inf}$ is advantageously equal to or greater than 310 mm for the passage of feet and is widened with respect to the minimum width, at least in the vertical section of minimum width, preferably forwards, namely by the shape of the rear surface 141 of the structure covering the front seat 10a.

As shown for example in the presently disclosed embodiment illustrated in FIG. 2, the shapes of the front 141 and rear 142 surfaces may be locally adapted, for example at a connection between the covering structure and the floor. Such adaptations, without jeopardizing the principles behind the presently disclosed embodiment, for example make it possible to conform to constraints on connections between the seat structures and the floor structures or to facilitate the upkeep of the zones subjected to materials that may be carried on the soles of shoes.

However, a minimum width $L_{inf}$ sought at floor level, for hz=0 if the floor is taken as the height reference, will be such that the user using the passage can get his or her feet through without the risk of finding him or herself stuck or impeded.

The presently disclosed embodiment also makes it possible to optimize the space used in a cabin through a staggered configuration of the seats that makes it possible to reduce the width needed to set out two rows of seats and by reducing the distance needed between two seats of one and the same row when a passage leading to an aisle and navigable by a population of users with an acceptable level of comfort is to be provided.

This configuration proves to be advantageous in the case of a set out against a wall, for example with 2+2 passengers abreast in an aircraft, or when two sets are juxtaposed, for example to form an arrangement of 2+4+2 passengers abreast in an aircraft.

What is claimed is:

1. A set comprising a plurality of seats arranged in a row along a longitudinal axis X, each seat comprising a chair and comprising a lateral pedestal arranged laterally on one side of the said chair, in which set all the chairs are oriented with a front side of each chair oriented in one and the same direction, in which set the chairs on the one hand and the lateral pedestals on the other are arranged in a staggered configuration in two rows which are parallel and parallel to the longitudinal axis X of the set of seats, each seat comprising a shell covering the said seat and determining a rear surface in a rear zone of the chair of the said seat and determining a front surface in a front zone of the lateral pedestal of the said seat, a space between a rear surface of a front seat and a front surface of a rear seat, situated immediately behind the said front seat in the set, forming a passage for an occupant of said rear seat, wherein, in a cross section formed in a vertical plane in which a minimum width Lmin of the passage is situated, each of the rear surface and the front surface have convex profiles facing one another, a width L(hz) of the said passage in the said vertical plane increasing continuously in the direction of decreasing heights hz above a reference cabin floor from a height hzmin of minimum width Lmin, at least down to near the floor, and the said width L(Hz) increasing continuously in the direction of increasing heights hz from the height hzmin of minimum width Lmin.

2. The set according to claim 1, wherein the minimum width Lmin of the passage is comprised between 200 mm and 300 mm and the height hzmin of said minimum width above the floor is comprised between 200 mm and 500 mm.

3. The set according to claim 1, wherein a maximum value for the width L(hz) of the passage, in the vertical plane in which the minimum width Lmin of the said passage is situated, is, for heights hz lower than the height hzmin, comprised between 310 mm and 400 mm, the said maximum value being situated between floor level and a height hz equal to or lower than 150 mm, the width L(hz=0) of the passage at floor level being at least equal to 250 mm.

4. The set according to claim 1, wherein a minimum value for the width L(hz) of the passage, measured in a horizontal section, is, for heights hz higher than the height hzmin, greater than the minimum width Lmin of the said passage and less than or equal to 400 mm, a larger value for the said minimum value of the width L(hz) being achieved for a height hz comprised between 600 mm and 800 mm.

5. The set according to claim 1, wherein the rear surface of the shell covering a seat in a rear zone of the chair of the said seat has a convex shape in the form of a semi-circle in cross sections on horizontal planes, giving the said rear surface an ellipsoidal cap shape.

6. The set according to claim 1, wherein the front surface of the shell covering a seat in a front zone of the lateral pedestal of the said seat has a shape that is straight in sections on horizontal planes, giving the said front surface the shape of a partial cylinder with horizontal axis and generatrices.

7. The set according to claim 1, wherein the lateral pedestal of a front seat has a volume open towards the rear to form a space for the feet of an occupant of a rear seat the chair of which is aligned with the said open volume because of the staggered configuration of the chairs and of the lateral pedestals.

8. The set according to claim 7, wherein a chair can be converted into a bed by relative movements of a backrest and of a seat cushion of the said chair in order, with a surface of a footrest, that is horizontal permanently or deployed in the open volume that forms the foot space, of the lateral pedestal of the seat situated in front of the seat of the chair in question, to form a lie-flat area.

9. The set according to claim 1, wherein the width L(hz) of the passage, in the cross section formed in a vertical plane in which the minimum width Lmin of the said passage is situated, is 324+/−10 mm at a height above the floor hz=130 mm, is 251+/−10 mm for hz=230 mm, is 232+/−10 mm for hz=330 mm, is 235+/−10 mm for hz=430 mm, is 246+/−10 mm for hz=530 mm, is 267+/−10 mm for hz=630 mm, and is 308+/−10 mm for hz=730 mm.

\* \* \* \* \*